US009908636B2

(12) United States Patent
Crosta et al.

(10) Patent No.: US 9,908,636 B2
(45) Date of Patent: Mar. 6, 2018

(54) METHOD AND DEVICE FOR DISPLAYING AT LEAST ONE POSITION INDICATOR FOR AN AIRCRAFT

(71) Applicant: AIRBUS OPERATIONS (S.A.S.), Toulouse (FR)

(72) Inventors: Franck Crosta, Leguevin (FR); Christophe Cail, Toulouse (FR)

(73) Assignees: AIRBUS OPERATIONS (S.A.S.), Toulouse (FR); AIRBUS (S.A.S.), Blagnac (FR)

( * ) Notice: Subject to any disclaimer, the term of this patent is extended or adjusted under 35 U.S.C. 154(b) by 0 days.

(21) Appl. No.: 15/211,616

(22) Filed: Jul. 15, 2016

(65) Prior Publication Data

US 2017/0021939 A1    Jan. 26, 2017

(30) Foreign Application Priority Data

Jul. 24, 2015    (FR) ..................... 15 57048

(51) Int. Cl.
*B64D 45/00*    (2006.01)
*B64D 43/00*    (2006.01)
(Continued)

(52) U.S. Cl.
CPC .......... *B64D 45/0005* (2013.01); *B64C 13/12* (2013.01); *B64D 43/00* (2013.01); *G01C 23/005* (2013.01)

(58) Field of Classification Search
CPC .... B64D 45/0005; B64D 43/00; B64C 13/12; G01C 23/005
(Continued)

(56) References Cited

U.S. PATENT DOCUMENTS 4,688,443 A    8/1987  Fabre et al.
5,125,602 A *  6/1992  Vauvelle ................. B64C 13/04
                                                        244/223

(Continued)

FOREIGN PATENT DOCUMENTS

EP    0 204 598    12/1986
EP    0835 802     4/1998
GB    2 447 967    10/2008

OTHER PUBLICATIONS

French Search Report for Application No. 1557048 dated Jun. 1, 2016.

*Primary Examiner* — Marthe Marc-Coleman
(74) *Attorney, Agent, or Firm* — Jenkins, Wilson, Taylor & Hunt, P.A.

(57) ABSTRACT

A method and device for displaying at least one position indicator for an aircraft. The display device includes at least one unit for generating information for determining, during a flight of the aircraft, a control value representative of the movement by a first pilot of his joystick relative to at least one of the roll and pitch axes of the aircraft, at least one computation unit for computing a piloting command representative of the control value determined by the unit for generating information, and one display unit for displaying at least one symbol on at least one screen intended for the second pilot and directly visible by the latter, the symbol representing the position indicator and being displayed on the screen in a position illustrating the piloting command on the screen.

20 Claims, 5 Drawing Sheets

(51) Int. Cl.
*B64C 13/12* (2006.01)
*G01C 23/00* (2006.01)
(58) Field of Classification Search
USPC ............ 701/3; 244/223, 228, 234, 229, 237;
318/675, 564, 628, 676
See application file for complete search history.

(56) References Cited

U.S. PATENT DOCUMENTS

| | | | | |
|---|---|---|---|---|
| 5,404,305 | A | * | 4/1995 | Stiles, Jr. ................. B64C 13/12 244/234 |
| 5,900,710 | A | * | 5/1999 | Gautier ................... B64C 13/12 244/223 |

* cited by examiner

METHOD AND DEVICE FOR DISPLAYING AT LEAST ONE POSITION INDICATOR FOR AN AIRCRAFT

CROSS-REFERENCE TO RELATED APPLICATION

This application claims the benefit of and priority to French patent application number 15 57048 filed on Jul. 24, 2015, the entire disclosure of which is incorporated by reference herein.

TECHNICAL FIELD

The present disclosure relates to a method and a device for displaying at least one position indicator for an aircraft, in particular for a transport aircraft.

The present disclosure applies to any type of aircraft configured so that it can be piloted by two pilots.

It is known that the manual piloting of an aircraft by a pilot about two of its three piloting (or control) axes, namely the pitch axis and the roll axis, is carried out by the intermediary of a joystick, in particular a mini-joystick. Such control sticks, notably of the mini-joystick type, therefore allow, by their first function, the lateral and longitudinal control of the aircraft.

BACKGROUND

Mini-joysticks are generally:
positioned on the lateral side, towards the outside with respect to the seats of the pilots; and
decoupled in their movement. Thus any action on one joystick does not give rise to movement of the opposite joystick.

The result of this design is that the movements made during flight, by a first pilot who is piloting the aircraft, on his joystick, can in certain circumstances be difficult or even impossible to perceive by the second pilot who is not doing the piloting.

The only way that the second pilot (the one not doing the piloting) can try to perceive the movement controlled by the first pilot is for him to change the direction in which he is looking or to lean forwards, which results in a loss of near and external vision.

This solution is not therefore entirely satisfactory.

SUMMARY

A purpose of the present disclosure is to overcome this disadvantage. The subject matter herein relates to a method for displaying at least one position indicator of at least a first joystick of an aircraft, the aircraft being configured so that it can be piloted by two pilots, a first pilot and a second pilot, the first joystick being configured so that it can be operated by the first pilot for piloting the aircraft about two piloting axes, namely the roll axis and the pitch axis.

According to the disclosure herein, the display method comprises:
a step of generating information comprising or consisting of determining, at least during a flight of the aircraft, at least one control value representative of the movement of the first joystick relative to at least one of the piloting axes of the aircraft;
a computation step comprising or consisting of computing at least one piloting command about at least one piloting axis, the piloting command being representative of the control value thus determined; and
a display step comprising or consisting of displaying at least one symbol, called a second symbol, on at least one screen, called the second screen, intended for the second pilot and directly visible by the latter, the second symbol representing the position indicator and being displayed on the second screen in a position illustrating the piloting command on that second screen.

In the context of the present disclosure, it is considered that a "screen is directly visible by a pilot" if that screen is visually accessible by the pilot from his seat without having to move his body and without having to change the direction in which he is looking, which is generally towards the front of the aircraft.

Thus, thanks to the disclosure herein, there is displayed on at least a screen of the pilot who is not piloting the aircraft, this screen being directly visually accessible without having to change the direction in which he is looking, a position indicator which is an item of information that is easily detectable by that pilot regarding the position of the other pilot's joystick, as described below.

It is not therefore necessary for a pilot to change the direction in which he is looking or to lean forwards in order to try to perceive the actions carried out on the other pilot's joystick. There is thus no resulting loss of near or external vision.

In a preferred embodiment, the display step comprises or consists of also displaying at least one symbol, called the first symbol, on at least one screen called the first screen intended for the first pilot (who is operating his joystick) and directly visible by the latter, the first symbol representing the position indicator and being displayed on the first screen in a position illustrating the piloting command on that first screen.

Advantageously, during the operation of the first joystick for piloting the aircraft simultaneously about the two piloting axes, each corresponding symbol is displayed on the screen in a position simultaneously illustrating the two piloting commands about these two piloting axes.

Moreover, in a particular embodiment, the method comprises a step of monitoring the piloting of the aircraft comprising or consisting of being able to detect a flight of the aircraft and a manual piloting phase and the display step comprises or consists of displaying the at least one position indicator solely when a flight situation of the aircraft with a manual piloting phase is detected and for as long as such a situation is detected.

Preferably, the steps of measuring, computation and display are implemented simultaneously for the first joystick configured to be able to be operated by the first pilot and for a second joystick configured to be able to be operated by the second pilot for piloting the aircraft about the two piloting axes.

Moreover, advantageously, on a same screen, the symbol representing the position indicator of the first joystick and the symbol representing the position indicator of the second joystick are visually differentiated.

The present disclosure also relates to a device for displaying at least one position indicator of at least a first joystick of an aircraft, the aircraft being configured so that it can be piloted by two pilots, a first pilot and a second pilot, the first joystick being configured so that it can be operated by the first pilot for piloting the aircraft about two piloting axes, namely the roll axis and the pitch axis.

According to the disclosure herein, the display device comprises:

at least one unit for generating information configured for determining, at least during a flight of the aircraft, at least one control value representative of the movement of the first joystick relative to at least one of the piloting axes of the aircraft;

at least one computation unit, configured for computing at least one piloting command about at least one piloting axis, the piloting command being representative of the control value determined by the unit for generating information; and a display unit configured for displaying at least one symbol called the second symbol on at least one screen called the second screen intended for the second pilot and directly visible by the latter, the second symbol representing the position indicator and being displayed on the second screen in a position illustrating the piloting command on that second screen.

In a preferred embodiment, the display unit is configured for also displaying at least one symbol called the first symbol on at least one screen called the first screen intended for the first pilot (who is operating his joystick) and directly visible by the latter, the first symbol representing the position indicator and being displayed on the first screen in a position illustrating the piloting command on that first screen.

Moreover, in a particular embodiment, the device comprises a unit for monitoring the piloting of the aircraft configured for being able to detect a flight of the aircraft and a manual piloting phase and the display unit is configured for displaying the at least one position indicator solely when a flight situation of the aircraft with a manual piloting phase is detected by the monitoring unit and for as long as such a situation is detected.

Moreover, advantageously, the measuring, computation and display units are used simultaneously for the first joystick configured to be able to be operated by the first pilot and for a second joystick configured to be able to be operated by the second pilot for piloting the aircraft about the two piloting axes.

The present disclosure also relates to a system for piloting an aircraft, comprising at least two joysticks each one being configured for being able to be operated by a pilot for piloting the aircraft about the roll axis and the pitch axis, the piloting system comprising a display device such as described above.

The present disclosure relates moreover to an aircraft, in particular a transport aircraft, which is provided with a display device and/or a piloting system such as those described above.

BRIEF DESCRIPTION OF THE DRAWINGS

The appended figures will give a good understanding of how the disclosure herein can be embodied. In these figures, identical references denote similar elements.

DETAILED DESCRIPTION

The present disclosure applies to an aircraft AC (FIGS. 1 and 2), for example a transport aircraft, which is configured so that it can be piloted by two pilots.

The manual piloting of the aircraft AC, by each pilot, about two of the three piloting (or control) axes, namely the pitch axis and the roll axis, is carried out by the intermediary of a joystick 2A, 2B, in particular a mini-joystick. These joysticks 2A and 2B are part of a piloting system 1 shown diagrammatically in FIG. 1.

Figure 1:
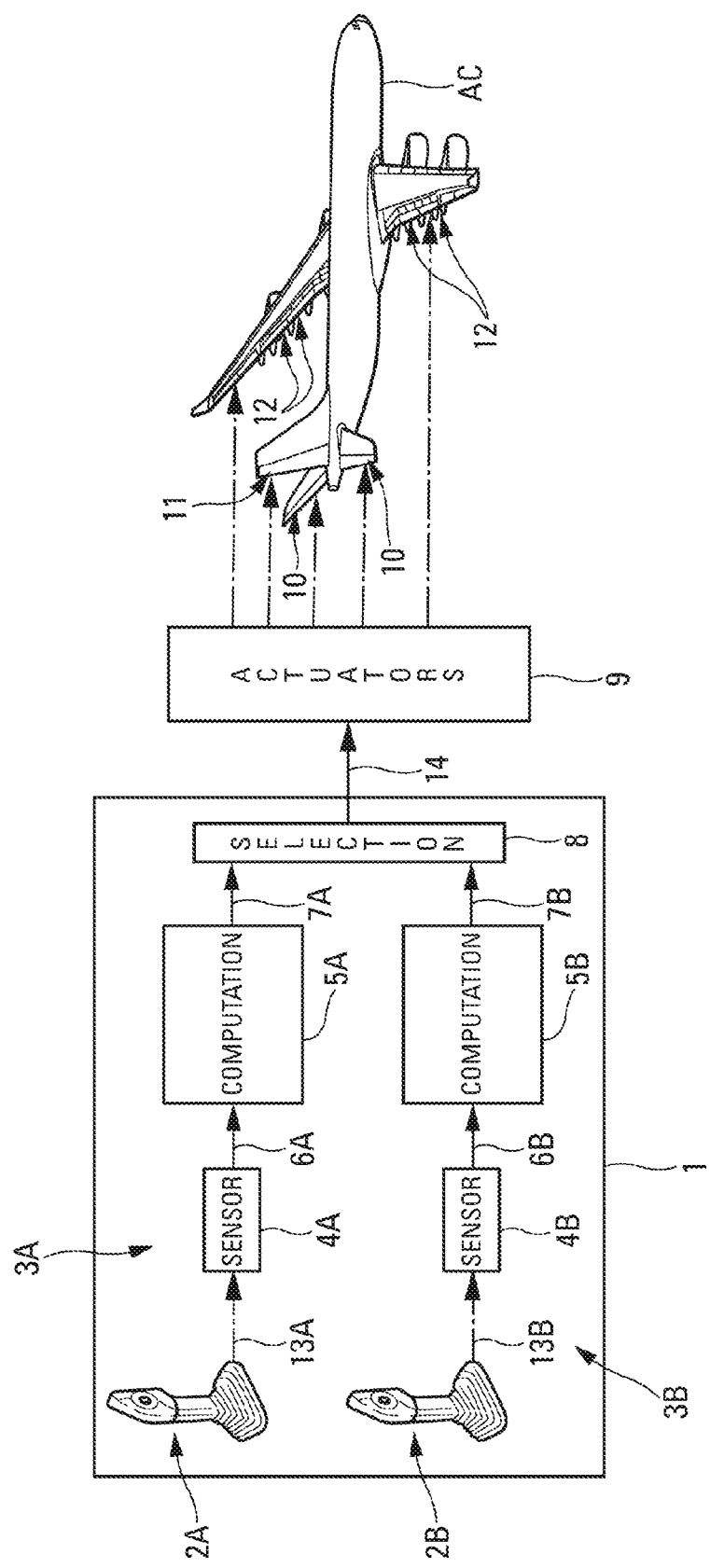
FIG. 1 is a block diagram of a system for piloting an aircraft.

Although in FIG. 1 the piloting system 1 is shown outside of the aircraft AC for reasons of clarity and simplification, this piloting system 1 is of course fitted inside the aircraft AC.

Figure 2:
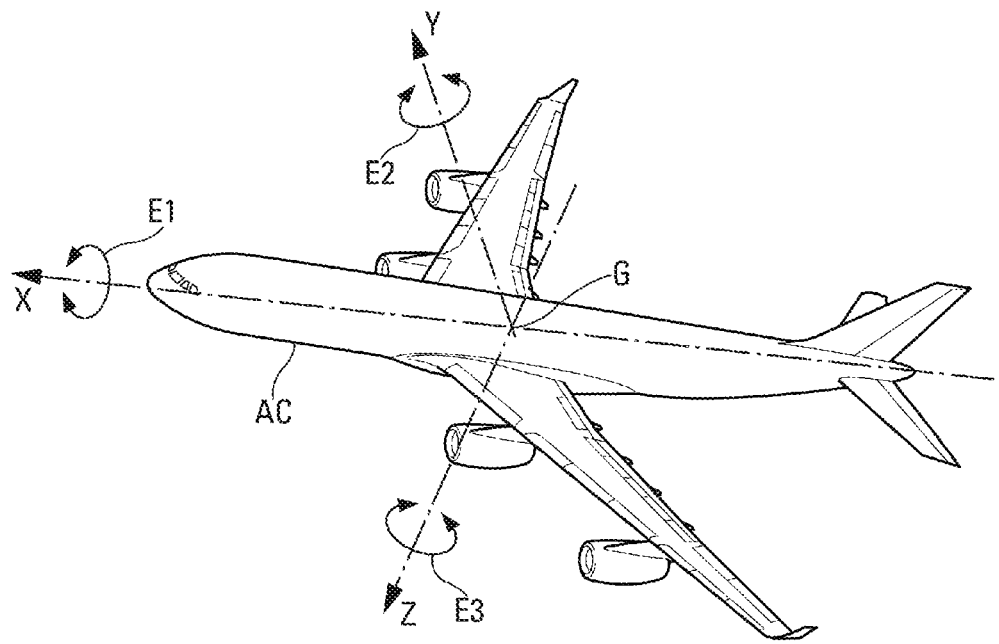
FIG. 2 shows an aircraft, namely a transport aircraft, upon which the three piloting axes are indicated.

Each joystick 2A, 2B (of the "side stick", "control column", etc. type), is configured so that it can be operated by a pilot, in order to control the aircraft AC with respect to these two piloting axes, that is to say with respect to the pitch axis Y and the roll axis X shown in FIG. 2.

The piloting system 1 also comprises, for each pilot, a rudder pedal (not shown) for piloting the aircraft with respect to the yaw axis Z. In FIG. 2, the axes X, Y and Z intersect at a point G, preferably the center of gravity of the aircraft AC, and the movement of the aircraft AC about the axes X, Y and Z is indicated respectively by the double arrows E1, E2 and E3 (respectively illustrating the variations of the roll, pitch and yaw angles).

The piloting system 1 is thus capable of allowing the pilots to pilot the aircraft AC about its three piloting (or control) axes, namely the pitch axis, the roll axis and the yaw axis.

Moreover, as shown in FIG. 1, a control system 3A, 3B is associated with each joystick 2A, 2B.

The piloting system 1 comprises for each control system 3A, 3B:

an assembly 4A, 4B of measuring or sensor elements (SENSOR) of usual type, which are capable of measuring, as illustrated by an arrow 13A, 13B drawn in dotted and dashed line, the amplitude of the deflections of the joystick 2A, 2B about its pivoting axes F1 and F2, described below with reference to FIGS. 5 and 6; and a computation unit 5A, 5B (COMPUTATION), for example a guidance computer of the aircraft of the FGC (Flight Guidance Computer) type, for determining control commands representative of the deflection or deflections measured by the assembly 4A, 4B and received via a link 6A, 6B.

The control commands (roll and pitch commands) generated by the computation units 5A and 5B are transmitted, respectively, by the intermediary of the links 7A and 7B to a selection assembly (SELECTION), for example a selector, which chooses the commands received from one of the computation means 5 and transmits them to an assembly of actuators 9 (ACTUATORS) of the aircraft AC.

These actuators are capable of actuating, in the usual way as illustrated diagrammatically by links drawn in dotted and dashed line, notably the usual elevators 10, rudder 11 and roll control surfaces 12 of the aircraft.

Figure 3:
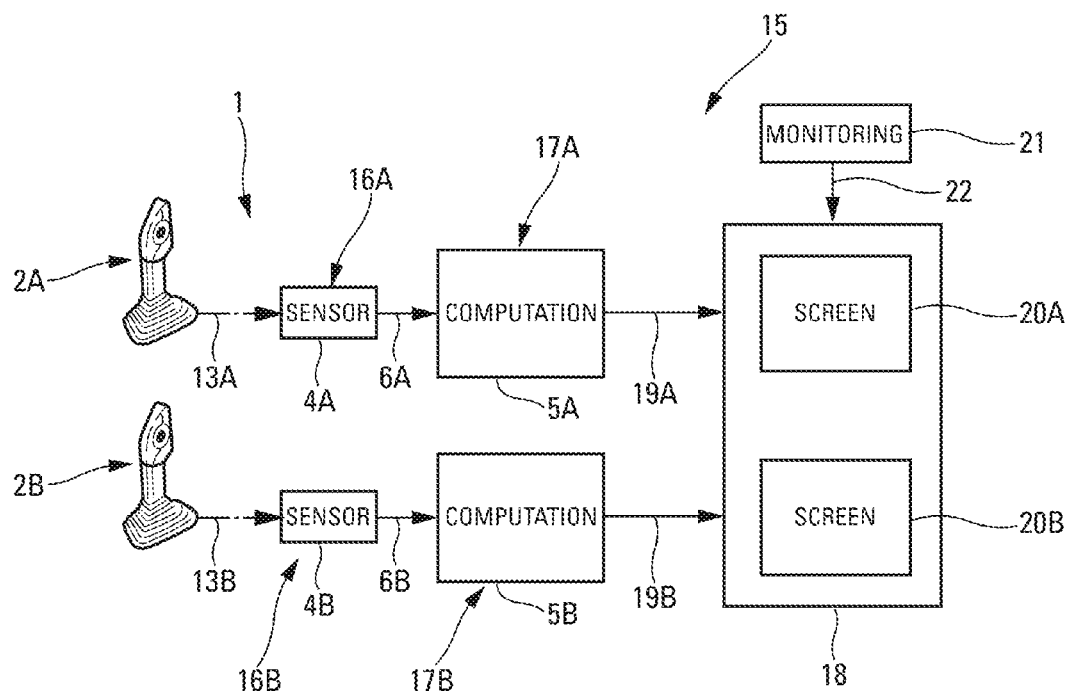
FIG. 3 is a block diagram of a particular embodiment of a display device.

The present disclosure principally relates to a display device 15 shown in FIG. 3, which preferably forms part of the piloting system 1.

This display device 15 is intended for displaying the position of at least one joystick 2A, 2B of the aircraft.

Figure 5:
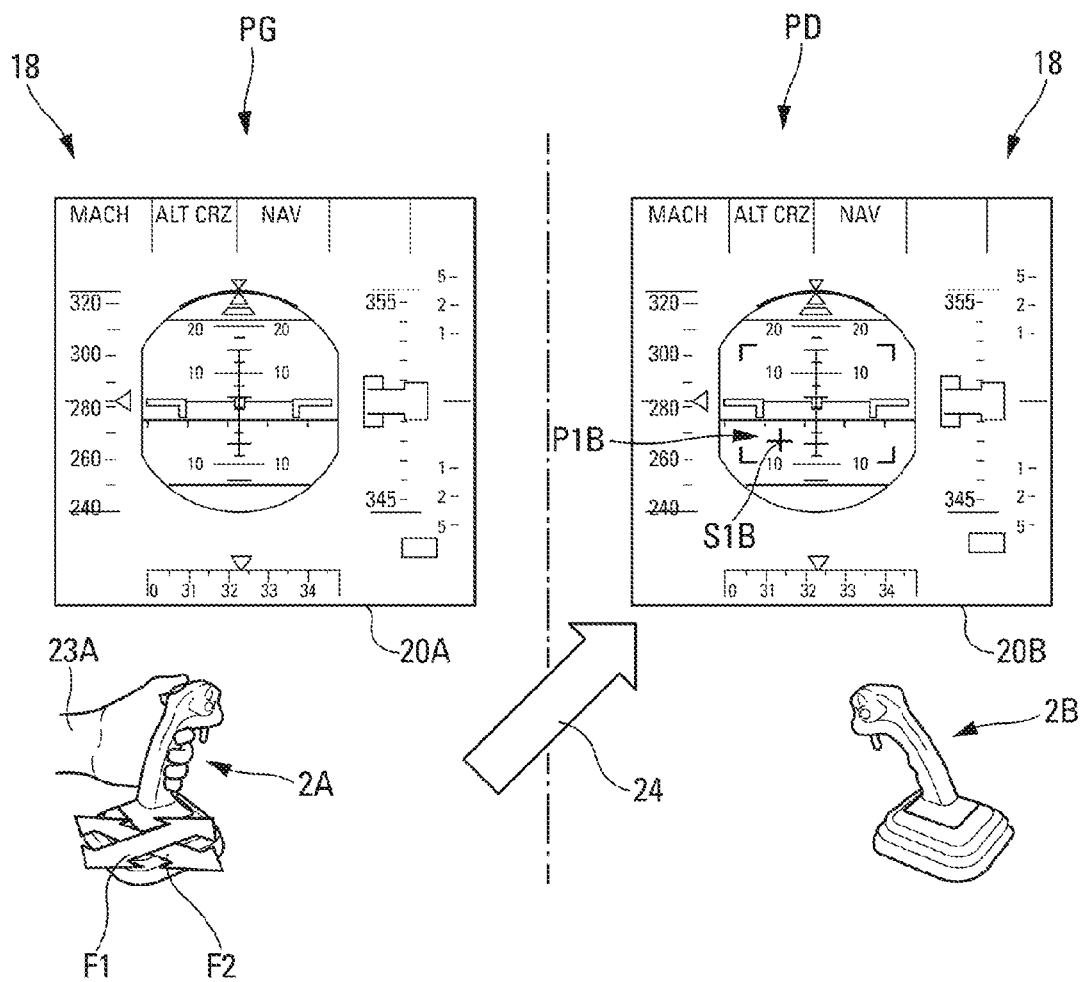
Figure 6:
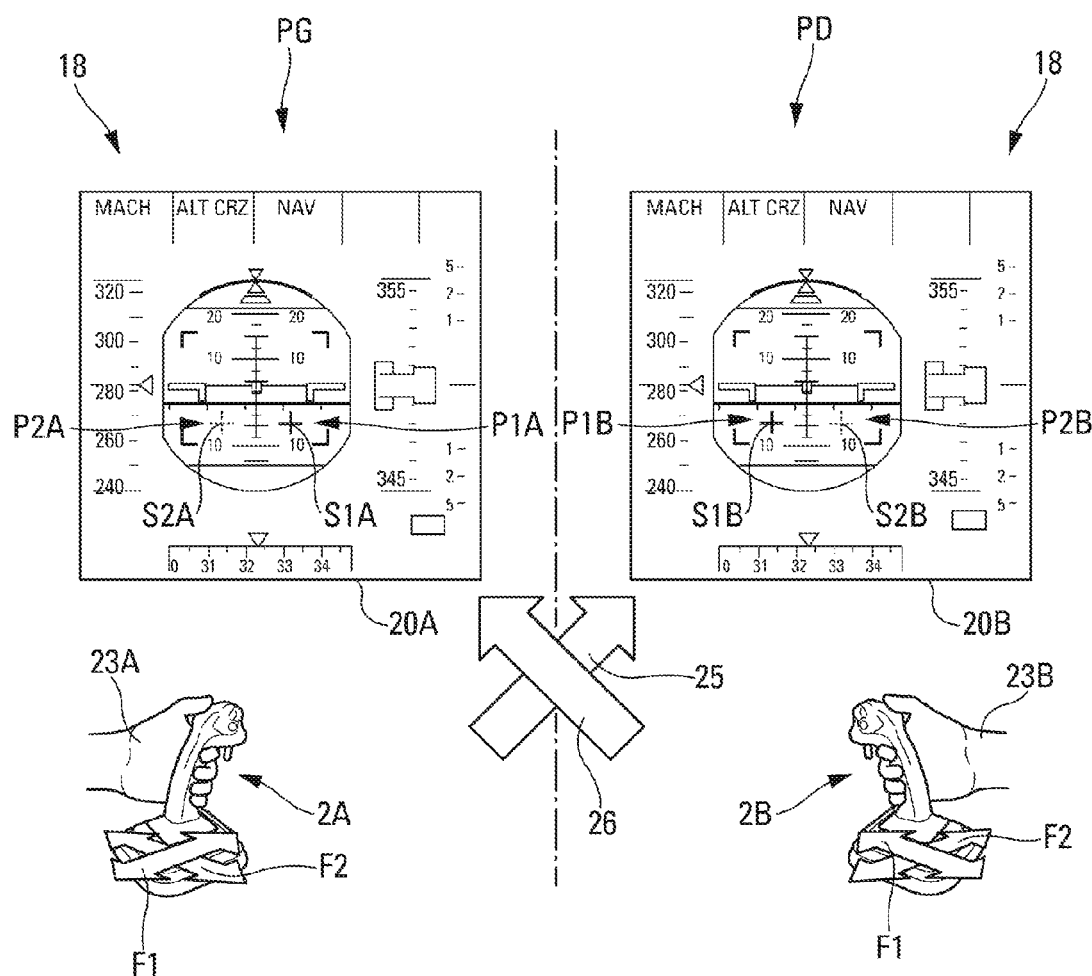

In order to do this, according to the disclosure herein, the display device 15, which is installed in the aircraft, comprises, as shown in FIG. 3:

a unit for generating information 16A, 16B configured for determining, at least during a flight of the aircraft, at least one control value representative of the movement of the joystick 2A, 2B by a pilot relative to at least one of the piloting axes X and Y (FIG. 2) of the aircraft;

a computation unit 17A, 17B configured for computing at least one piloting command about at least one piloting axis X, Y, the piloting command being representative of the control value determined by the unit for generating information 16A, 16B; and a display unit 18 connected by the intermediary of a link 19A, 19B to the computation unit 17A, 17B and configured for displaying at least one symbol on at least one screen 20A, 20B (SCREEN), this screen being intended for the other pilot and directly visible by the latter, the symbol being representative of the position indicator and being displayed on the screen in a position illustrating the piloting command on that screen, as described below with reference to FIGS. 5 and 6.

In a preferred embodiment, the display unit 18 is configured for also displaying at least one symbol on the screen intended for the pilot who is operating his joystick. This screen is also directly visible by that pilot. The symbol represents a position indicator and is displayed on the screen in a position illustrating the corresponding piloting command on that screen.

In the context of the present disclosure, the displaying of the symbol can therefore by carried out either solely on the screen of the other pilot, or on the screens of both of the pilots.

It is considered that a "screen is directly visible by a pilot" if that screen is visually accessible by the pilot from his seat without having to move his body and without having to change the direction in which he is looking which is directed towards the front of the aircraft.

Figure 4:
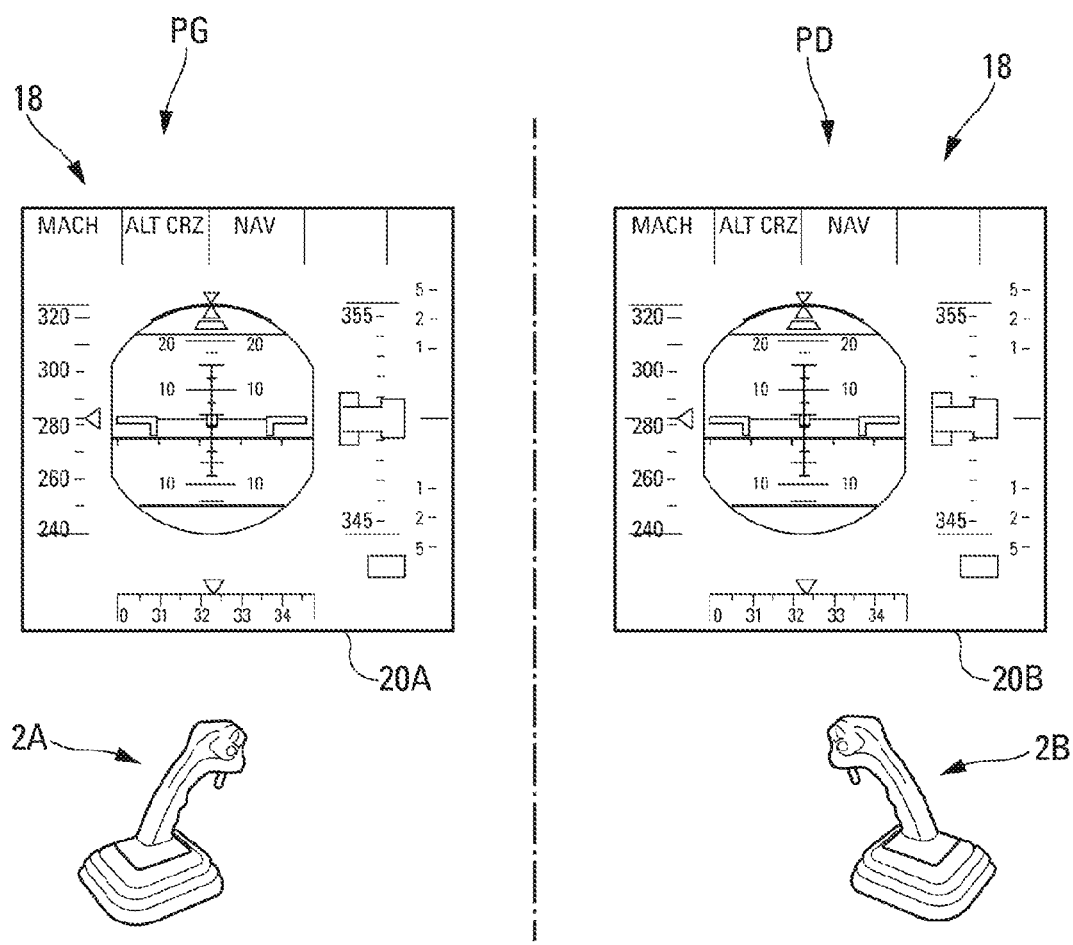
FIGS. 4 through 6 show joysticks and display screens, those on the right hand half being intended for one of the pilots and those on the left hand half being intended for the other pilot, for different piloting situations respectively.

The display device 15 can comprise any type of visually accessible screen. In the context of the present disclosure, the screen or screens 20A and 20B of the display unit 18 can correspond to at least one of the following screens:

a navigation screen of the ND (Navigation Display) type;

a centralized electronic monitoring screen of the ECAM (Electronic Centralized Aircraft Monitoring) type; and a screen for displaying primary flight parameters of the PFD (Primary Flight Display) type, as shown in the examples in FIGS. 4 through 6.

In a particular embodiment shown in FIG. 1, the display device 15 comprises:

a unit for generating information 16A and a computation unit 17A associated with the joystick 2A; and a unit for generating information 16B and a computation unit 17B associated with the joystick 2B.

Moreover, in this particular embodiment:

the unit for generating information 16A corresponds to the assembly 4A of the piloting system 1 (FIG. 1);

the computation unit 17A corresponds to the computation unit 5A;

the unit for generating information 16B corresponds to the assembly 4B; and the computation unit 17B corresponds to the computation unit 5B.

In a variant embodiment (not shown), some of the aforethe elements of FIGS. 1 and 3 can be different, in particular the computation unit 17A, 17B can be different from the computation unit 5A, 5B.

Of course, during the operating of a joystick for piloting the aircraft simultaneously about the two piloting axes (roll and pitch), each corresponding symbol is displayed on the screen in a position simultaneously illustrating the two piloting commands about these two piloting axes.

Moreover, in a preferred embodiment, the display device 15 comprises a monitoring unit 21. This monitoring unit 21 is configured for being able to detect, in a usual manner, that the aircraft is in flight (and not on the ground) and that it is in a manual piloting phase, that is to say that it is being piloted manually by one of the pilots (and not automatically). The display unit 18 is connected via a link 22 to the monitoring unit 21 and it is configured for displaying the position indicator or indicators, solely when a flight situation of the aircraft with a manual piloting phase is detected by the monitoring unit 21 and for as long as such a situation is detected.

Moreover, in a preferred embodiment, the aforethe measuring, computation and display units are used simultaneously, for the joystick 2A configured so that it can be operated by a first pilot, preferably the flying pilot (who is carrying out the flight), and for the joystick 2B configured so that it can be operated by the second pilot, preferably the copilot (who is not carrying out the flight).

Moreover, on a same screen 20A, 20B, the symbol S2A, S1B representing the position indicator of the joystick 2A and the symbol S1A, S2B representing the position indicator of the joystick 2B are visually differentiated, notably by different symbologies, colors and/or luminous intensities, as illustrated by way of example in FIG. 6.

In the examples of FIGS. 5 and 6, the symbols are represented in the form of a cross. However, in the context of the present disclosure, the symbols can be represented using any shape and color symbology whatsoever.

The present disclosure is described hereafter with the help of three examples of piloting situations, respectively shown in FIGS. 4 through 6. In each of these FIGS. 4 through 6, the screen 20A and the joystick 2A of the left hand side PG are dedicated to one of the pilots, hereafter called the first pilot, notably the flying pilot, and the screen 20B and the joystick 2B on the right hand side PD are dedicated to the other pilot, hereafter called the second pilot, notably the copilot. In these FIGS. 4 through 6, the screens 20A and 20B are usual screens for displaying primary flight parameters of the PFD type, and are not described in more detail.

In the example shown in FIG. 4, neither of the two pilots is operating his joystick 2A, 2B. Therefore, no symbol representing a position indicator is displayed on the screens 20A and 20B.

In the example shown in FIG. 5, the first pilot, whose hand 23A is shown, is operating his joystick 2A. In this case, a display is produced on the screen 20B of the second pilot, as illustrated by an arrow 24. More precisely, a symbol S1B is displayed on the screen 20B, and this is done in a position P1B which is representative, on the screen 20B, of the control command generated by the operation of the joystick 2A, in the directions of pivoting F1 (forwards/backwards) and/or F2 (right/left) in order to carry out the piloting of the aircraft, respectively according to the pitch axis Y and the roll axis X (FIG. 2).

In this example shown in FIG. 5, the display unit 18 is configured so that a display is produced solely on the screen 20B of the second pilot and not on the screen 20A of the first pilot who is operating his joystick 2A.

Moreover, in the example shown in FIG. 6, the first pilot, whose hand 23A is shown, is operating his joystick 2A. In this case, a display is therefore produced on the screen 20B of the second pilot, as illustrated by an arrow 25. More precisely, the symbol S1B (represented in the form of a cross drawn in continuous line) is displayed on the screen 20B, in a position P1B which is representative of the control command generated by the operation of the joystick 2A in the directions of pivoting F1 (forwards/backwards) and/or F2 (right/left).

Moreover, in this example shown in FIG. 6, the second pilot, whose hand 23B is shown, is also operating his joystick 2B. In this case, a display is produced on the screen 20A of the first pilot, as illustrated by an arrow 26. More precisely, the symbol S1A (represented in the form of a cross drawn in continuous line) is displayed on the screen 20A, and this is done in a position P1A which is representative, on the screen 20A, of the control command generated by the operation of the joystick 2B in the directions of pivoting F1 (forwards/backwards) and/or F2 (right/left).

Moreover, in this example shown in FIG. 6, the display unit 18 is configured for also displaying a symbol on the screen intended for the pilot who is operating his joystick. More precisely:

the symbol S2A (shown in the form of a cross drawn in dashed line) is displayed on the screen 20A, and this is done in a position P2A which is representative of the control command generated by the operation of the joystick 2A in the directions of pivoting F1 and/or F2; and the symbol S2B (shown in the form of a cross drawn in dashed line) is displayed on the screen 20B, and this is done in a position P2B which is representative of the control command generated by the operation of the joystick 2B in the directions of pivoting F1 and/or F2.

The functioning of the display device 15, as described above, is as follows.

During the operation of a joystick 2A, 2B by a pilot for piloting the aircraft about the pitch and/or roll axes:

the unit for generating information 16A, 16B determines a control value representative of the movement of the joystick thus operated;

the computation unit 17A, 17B computes at least piloting commands about these piloting axes, the piloting commands being representative of the control value determined by the unit for generating information 16A, 16B; and the display unit 18 displays a symbol on at least one screen intended for the other pilot and directly visible by the latter, this symbol being displayed on the screen in a position on that screen illustrating the piloting commands.

The display device 15 can also display a symbol on the screen of the pilot who is operating his joystick 2A.

Thus, the display device 15 displays, on a screen, an item of information that is easily detectable and interpretable by a pilot with regard to the position of the joystick of the other pilot. It is therefore no longer necessary for a pilot to change the direction in which he is looking or to lean forwards in order to try to perceive the actions carried out on the joystick of the other pilot. The result of this is that there is no loss of near or external vision.

The display device 15 therefore makes it possible to display, whatever the flight phase may be, during a deflection of a joystick, a symbol on a screen, for example on a primary flight screen of the PFD (Primary Flight Display) type. Thus, any individual or cumulative action of the pilot or pilots controlling the flight on their respective joystick is immediately displayed on the screen and is perceived by the whole of the crew.

The subject matter disclosed herein can be implemented in software in combination with hardware and/or firmware. For example, the subject matter described herein can be implemented in software executed by a processor or processing unit. In one exemplary implementation, the subject matter described herein can be implemented using a computer readable medium having stored thereon computer executable instructions that when executed by a processor of a computer control the computer to perform steps. Exemplary computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

While at least one exemplary embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for displaying at least a first position indicator of a first joystick of an aircraft, the aircraft being configured to be piloted by a first pilot and a second pilot, the first joystick being configured to be operated by the first pilot for piloting the aircraft about two piloting axes, which comprise a roll axis and a pitch axis, the method comprising steps of:

generating information, comprising determining, at least during a flight of the aircraft, a first control value representative of a movement of the first joystick relative to at least one of the two piloting axes of the aircraft;

computing a first piloting command about at least one of the two piloting axes, wherein the first piloting command is representative of the first control value thus determined; and displaying a first symbol on a second screen in a position that is directly visible by the second pilot, wherein the first symbol represents the first position indicator and is displayed on the second screen in a position illustrating the first piloting command on the second screen.

2. The method of claim 1, comprising a step of displaying the first symbol on a first screen first in a position that is directly visible by the first pilot, wherein the first symbol is representative of the first position indicator and is displayed on the first screen in a position illustrating the first piloting command on the first screen.

3. The method of claim 2, wherein, during operation of the first joystick for piloting the aircraft simultaneously about the two piloting axes, the first symbol is displayed on the first and second screens in a position simultaneously illustrating the first piloting command about the two piloting axes.

4. The method of claim 1, comprising a step of detecting a flight of the aircraft and a manual piloting phase, wherein displaying the first symbol comprises displaying the first position indicator solely when a flight situation of the aircraft with a manual piloting phase is detected, for as long as the flight situation is detected.

5. The method of claim 1, comprising, for displaying a second position indicator of a second joystick of the aircraft, the second joystick being configured to be operated by the second pilot for piloting the aircraft about the two piloting axes:
- generating information, comprising determining, at least during a flight of the aircraft, a second control value representative of a movement of the second joystick relative to at least one of the two piloting axes of the aircraft;
- computing a second piloting command about at least one of the two piloting axes, wherein the second piloting command is representative of the second control value thus determined; and
- displaying a second symbol on a first screen in a position that is directly visible by the first pilot,
- wherein the second symbol represents the second position indicator and is displayed on the second screen in a position illustrating the at least one piloting command on the second screen.

6. The method of claim 5, wherein:
- during operation of the first joystick for piloting the aircraft simultaneously about the two piloting axes, the first symbol is displayed on the second screen in a position simultaneously illustrating the first piloting command about the two piloting axes, and
- during operation of the second joystick for piloting the aircraft simultaneously about the two piloting axes, the second symbol is displayed on the first screen in a position simultaneously illustrating the second piloting command about the two piloting axes.

7. The method of claim 5, comprising displaying the first symbol on the first screen in a position that is directly visible by the first pilot, wherein the first symbol is representative of the first position indicator and is displayed on the first screen in a position illustrating the first piloting command on the first screen.

8. The method of claim 7, wherein:
- during operation of the first joystick for piloting the aircraft simultaneously about the two piloting axes, the first symbol is displayed on the first and second screens in a position simultaneously illustrating the first piloting command about the two piloting axes, and
- during operation of the second joystick for piloting the aircraft simultaneously about the two piloting axes, the second symbol is displayed on the first screen in a position simultaneously illustrating the second piloting command about the two piloting axes.

9. The method of claim 7, comprising displaying the second symbol on the second screen in a position that is directly visible by the second pilot, wherein the second symbol is representative of the second position indicator and is displayed on the second screen in a position illustrating the second piloting command on the second screen.

10. The method of claim 9, wherein:
- during operation of the first joystick for piloting the aircraft simultaneously about the two piloting axes, the first symbol is displayed on the first and second screens in a position simultaneously illustrating the first piloting command about the two piloting axes, and
- during operation of the second joystick for piloting the aircraft simultaneously about the two piloting axes, the second symbol is displayed on the first and second screens in a position simultaneously illustrating the second piloting command about the two piloting axes.

11. The method of claim 9, wherein the first and second symbols on the first screen are visually differentiated from each other, and wherein the first and second symbols on the second screen are visually differentiated from each other.

12. The method of claim 5, comprising displaying the second symbol on the second screen in a position that is directly visible by the second pilot, wherein the second symbol is representative of the second position indicator and is displayed on the second screen in a position illustrating the second piloting command on the second screen.

13. The method of claim 12, wherein:
- during operation of the first joystick for piloting the aircraft simultaneously about the two piloting axes, the first symbol is displayed on the second screen in a position simultaneously illustrating the first piloting command about the two piloting axes, and
- during operation of the second joystick for piloting the aircraft simultaneously about the two piloting axes, the second symbol is displayed on the first and second screens in a position simultaneously illustrating the second piloting command about the two piloting axes.

14. A device for displaying at least a first position indicator of a first joystick of an aircraft, the aircraft being configured to be piloted by a first pilot and a second pilot, the first joystick being configured to be operated by the first pilot for piloting the aircraft about two piloting axes, which comprise a roll axis and a pitch axis, the device comprising:
- a first unit for generating information, which is configured for determining, at least during a flight of the aircraft, a first control value representative of a movement of the first joystick relative to at least one of the two piloting axes of the aircraft;
- a first computation unit, which is configured for computing a first piloting command about at least one of the two piloting axes, wherein the first piloting command is representative of the first control value determined by the first unit for generating information; and
- a display unit configured for displaying a first symbol on a second screen in a position that is directly visible by the second pilot,
- wherein the display unit is configured for displaying the first symbol representing the first position indicator on the second screen in a position illustrating the first piloting command on the second screen.

15. The device of claim 14, wherein the display unit is configured for displaying the first symbol on a first screen in a position that is directly visible by the first pilot, wherein the first symbol represents the first position indicator and is displayed on the first screen in a position illustrating the first piloting command on the first screen.

16. The device of claim 14, comprising a unit for monitoring the piloting of the aircraft to detect a flight of the aircraft and a manual piloting phase, wherein the display unit is configured for displaying the first position indicator solely when a flight situation of the aircraft with a manual piloting phase is detected by the monitoring unit, for as long as the flight situation is detected.

17. The device of claim 14, the device being configured for displaying a second position indicator of a second joystick of the aircraft, the second joystick being configured to be operated by the second pilot for piloting the aircraft about the two piloting axes, the device comprising:
- a second unit for generating information, which is configured for determining, at least during a flight of the aircraft, a second control value representative of a movement of the second joystick relative to at least one of the two piloting axes of the aircraft; and
- a second computation unit, which is configured for computing a second piloting command about at least one of the two piloting axes, wherein the second piloting command is representative of the second control value determined by the second unit for generating information, wherein the display unit is configured for displaying a second symbol on a first screen in a position that is directly visible by the first pilot, and wherein the display unit is configured for displaying the second symbol representing the second position indicator on the first screen in a position illustrating the second piloting command on the first screen.

18. The device of claim 17, wherein the display unit is configured for:

displaying the first symbol on the first screen in a position that is directly visible by the first pilot, the first symbol being representative of the first position indicator and being displayed on the first screen in a position illustrating the first piloting command on the first screen, and displaying the second symbol on the second screen in a position that is directly visible by the second pilot, wherein the second symbol is representative of the second position indicator and is displayed on the second screen in a position illustrating the second piloting command on the second screen.

19. A system for piloting an aircraft, the system comprising at least first and second joysticks, each of which is configured to be operated by a first pilot, second pilot, respectively, for piloting the aircraft about two piloting axes, which comprise a roll axis and a pitch axis, the system comprising:

a device for displaying at least a first position indicator of the first joystick, the device comprising:

a first unit for generating information, which is configured for determining, at least during a flight of the aircraft, a first control value representative of a movement of the first joystick relative to at least one of the two piloting axes of the aircraft;

a first computation unit, which is configured for computing a first piloting command about at least one of the two piloting axes, wherein the first piloting command is representative of the first control value determined by the first unit for generating information; and a display unit configured for displaying a first symbol on a second symbol in a position that is directly visible by the second pilot, wherein the display unit is configured for displaying the first symbol representing the first position indicator on the second screen in a position illustrating the first piloting command on the second screen.

20. The system of claim 19, wherein the device is configured for displaying a second position indicator of the second joystick, the device comprising:

a second unit for generating information, which is configured for determining, at least during a flight of the aircraft, a second control value representative of a movement of the second joystick relative to at least one of the two piloting axes of the aircraft; and a second computation unit, which is configured for computing a second piloting command about at least one of the two piloting axes, wherein the second piloting command is representative of the second control value determined by the second unit for generating information, wherein the display unit is configured for displaying a second symbol on a first screen in a position that is directly visible by the first pilot, and wherein the display unit is configured for displaying the second symbol representing the second position indicator on the first screen in a position illustrating the second piloting command on the first screen.

* * * * *